United States Patent
Li et al.

(10) Patent No.: US 12,523,613 B2
(45) Date of Patent: Jan. 13, 2026

(54) ADDRESSING LIGHT ABSORBANCE DURING INTERFEROMETRIC TESTING THROUGH ALGORITHMIC DECONVOLUTION AND COMPUTATION

(71) Applicant: ACCESS MEDICAL SYSTEMS, LTD., Palo Alto, CA (US)

(72) Inventors: Genqian Li, Shanghai (CN); Dianzhuang Wang, Shanghai (CN); Jessie Peh, Saratoga, CA (US); Ao-Mei Lee, East Palo Alto, CA (US)

(73) Assignee: ACCESS MEDICAL SYSTEMS, LTD., Palo Alto, CA (US)

( * ) Notice: Subject to any disclaimer, the term of this patent is extended or adjusted under 35 U.S.C. 154(b) by 0 days.

(21) Appl. No.: 19/102,010

(22) PCT Filed: Sep. 6, 2023

(86) PCT No.: PCT/US2023/073559
§ 371 (c)(1),
(2) Date: Feb. 7, 2025

(87) PCT Pub. No.: WO2024/054852
PCT Pub. Date: Mar. 14, 2024

(65) Prior Publication Data
US 2025/0258103 A1    Aug. 14, 2025

Related U.S. Application Data

(60) Provisional application No. 63/374,724, filed on Sep. 6, 2022.

(51) Int. Cl.
*G01N 21/77* (2006.01)
*G01N 21/45* (2006.01)

(52) U.S. Cl.
CPC ............ *G01N 21/77* (2013.01); *G01N 21/45* (2013.01); *G01N 2021/7779* (2013.01)

(58) Field of Classification Search
CPC . G01N 21/77; G01N 21/45; G01N 2021/7779
See application file for complete search history.

(56) References Cited

U.S. PATENT DOCUMENTS 6,061,139 A    5/2000  Takezawa et al.
11,604,140 B2 *  3/2023  Tan ................... G01N 21/7703
(Continued)

*Primary Examiner* — Ricky Go
(74) *Attorney, Agent, or Firm* — Perkins Coie LLP; Viola T. Kung; Andrew T. Pettit

(57) ABSTRACT

Introduced here is an approach to programmatically addressing the absorbance of light by analyte molecules whose binding, for example, to an interferometric sensor, is being monitored by an interferometric sensing system. A first light signal may be shone upon a biolayer over the course of a biochemical test, and the light reflected by the biolayer may form a second light signal that is detectable by a detector of an interferometric sensing system. Through analysis of the second light signal, the second light signal can be deconvolved into a reflection component and an absorbance component. If the principal component of the second light signal is the reflection component, then one algorithm may be employed to establish the binding magnitude. If the principal component of the second light signal is the absorbance component, then another algorithm may be employed to establish the binding magnitude.

15 Claims, 13 Drawing Sheets

(56) References Cited

U.S. PATENT DOCUMENTS

| | | | |
|---|---|---|---|
| 2010/0188665 A1* | 7/2010 | Dotson | G01N 21/45 |
| | | | 356/517 |
| 2011/0104709 A1 | 5/2011 | Yoshimizu et al. | |
| 2012/0015376 A1 | 1/2012 | Bornhop | |
| 2018/0042583 A1* | 2/2018 | Pringle | G01N 27/623 |
| 2019/0170639 A1* | 6/2019 | Laude | G01N 21/6486 |

* cited by examiner

ADDRESSING LIGHT ABSORBANCE DURING INTERFEROMETRIC TESTING THROUGH ALGORITHMIC DECONVOLUTION AND COMPUTATION

This application is a national stage entry of International Application No. PCT/US2023/073559, filed Sep. 6, 2023; which claims priority to U.S. Provisional Application No. 63/374,724, filed Sep. 6, 2022, each of which is incorporated herein by reference in its entirety.

FIELD OF THE INVENTION

Various embodiments concern approaches to programmatically addressing the absorbance of light by analyte molecules whose binding, for example, to an interferometric sensor, is being monitored by an interferometric sensing system and associated computer programs.

BACKGROUND

Diagnostic tests based on binding events between analyte molecules and analyte-binding molecules are widely used in medical, veterinary, agricultural, and research applications. These diagnostic tests can be employed to detect whether analyte molecules are present in a sample, the amount of analyte molecules in a sample, or the rate of binding of analyte molecules to the analyte-binding molecules. Together, an analyte-binding molecule and its corresponding analyte molecule form an analyte-anti-analyte binding pair (or simply "binding pair"). Examples of binding pairs include complementary strands of nucleic acids, antigen-antibody pairs, and receptor-receptor binding agents. The analyte can be either member of the binding pair, and the anti-analyte can be the other member of the binding pair.

Historically, diagnostic tests have employed a solid, planar surface having analyte-binding molecules immobilized thereon. Analyte molecules in a sample will bind to these analyte-binding molecules with high affinity in a defined detection zone. In this type of assay, known as a "solid-phase assay," the solid surface is exposed to the sample under conditions that promote binding of the analyte molecules to the analyte-binding molecules. Generally, the binding events are detected directly by measuring changes in mass, reflectivity, thickness, color, or another characteristic indicative of a binding event. For example, when an analyte molecule is labeled with a chromophore, fluorescent label, or radiolabel, the binding events are detectable based on how much, if any, label can be detected within the detection zone. Alternatively, the analyte molecule could be labeled after it has bound to an analyte-binding molecule within the detection zone.

U.S. Pat. No. 5,804,453 discloses a method of determining the concentration of a substance in a sample solution, using an optical fiber having a reagent (i.e., a capturing molecule) coated on its distal end to which the substance binds. The distal end is then immersed into the sample solution containing the substance. Binding of the substance to the reagent generates an interference pattern and is detected by a spectrometer.

U.S. Pat. No. 7,394,547 discloses a biosensor with a first optically transparent element that is mechanical attached to an optical fiber tip with an air gap between them. A second optical element that acts as the interference layer with a thickness greater than 50 nanometers (nm) is then attached to the distal end of the first optical element. The biolayer is formed on the peripheral surface of the second optical element. An additional reflective surface layer with a thickness between 5-50 nm and a refractive index greater than 1.8 is coated between the interference layer and the first optical element. The principle of detecting an analyte in a sample based on the changes of spectral interference is described in this reference, which is incorporated herein by reference in its entirety.

U.S. Pat. No. 7,319,525 discloses a different configuration in which a section of an optical fiber is mechanically attached to a tip connector consisting of one or more optical fibers with an air gap between the proximal end of the optical fiber section and the tip connector. The interference layer and then the biolayer are built on the distal surface of the optical fiber section.

Although the prior art provides functionality in utilizing biosensors based on thin-film interferometers, there exists a need for improvements in the performance of these interferometers.

Figure 1B:
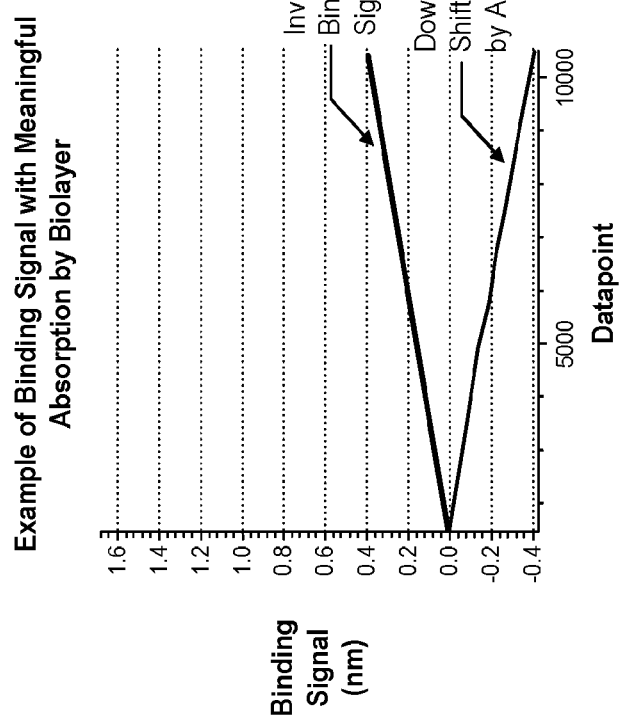
FIG. 1B illustrates how, in some situations, the binding signal may experience a downward shift rather than an upward shift in magnitude.

Embodiments are illustrated by way of example and not limitation in the drawings. While the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications

DETAILED DESCRIPTION

As part of a diagnostic test, light may be shone on an interferometric sensor on which a biolayer forms. Generally, formation of the biolayer is prompted by depositing analyte-binding molecules along one side of the interferometric sensor and then exposing the interferometric sensor to a liquid sample. Analyte molecules in the liquid sample bind to the analyte-binding molecules over time to form a biolayer, and these binding activities are evidenced by an interference pattern that is detectable by a detector of an interferometric sensing system.

As further discussed below, an incident light signal (also called a "first light signal") is shone toward the biolayer, while light reflected by the biolayer results in the creation of a reflected light signal (also called a "second light signal"). The first and second light signals form a spectral interference pattern. As analyte molecules bind to the analyte-binding molecules—thereby increasing the thickness of the biolayer—the optical path of the second light signal lengthens. As a result, the spectral interference pattern shifts. By measuring the phase shift in real time, a binding signal (also called a "binding curve") can be plotted as the amount of shift versus time. One example of a binding signal is provided in FIG. 1A. Binding signals can be helpful in establishing not only the rate at which analyte molecules bind to analyte-binding molecules but also the total amount of analyte molecules in the liquid sample being examined.

Figure 1A:
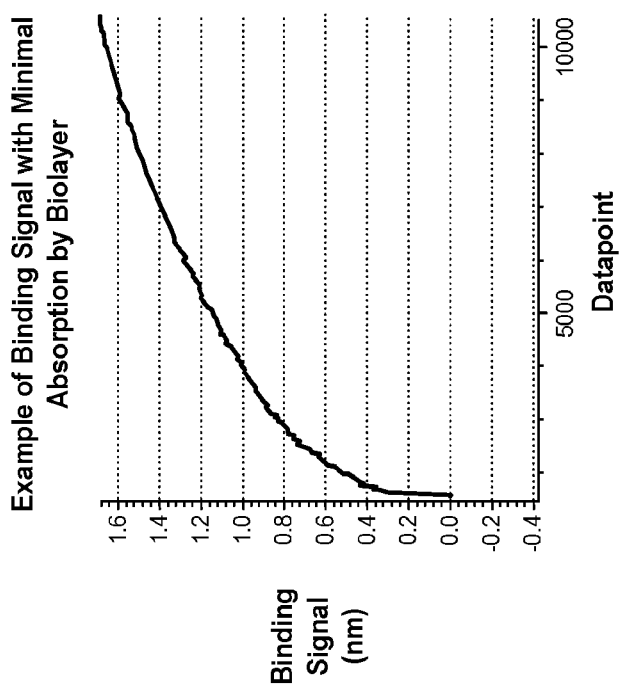
FIG. 1A illustrates one example of a binding signal.

This approach to generating binding signals works well when the analyte molecules are small (e.g., when the analyte molecules are proteins or antibodies). Simply put, as small analyte molecules bind to the corresponding analyte-binding molecules, the spectral interference pattern consistently shifts and the binding signal consistently increases in magnitude. However, there are some situations—namely, where the analyte molecules are large and/or complex—where the binding signal will experience a downward shift rather than an upward shift in magnitude as shown in FIG. 1B. This is problematic as the binding signal will indicate that the biolayer is actually decreasing in size rather than increasing in size. Examples of large analyte molecules include some cells, viruses, phages, nanoparticles (e.g., lipid nanoparticles), and manmade structures (e.g., magnetic particles).

Historically, these situations have been addressed by "flipping" the binding signal, employing an algorithm that plots the absolute value rather than the actual value as shown in FIG. 1B. However, this makeshift solution does not actually address the underlying problem, which was not well understood until recently. At a high level, the underlying problem is that large analyte molecules can absorb a meaningful amount of the first light signal that is shone onto the biolayer. While a biolayer formed with small analyte molecules will reflect nearly all of the first light signal, biolayers formed with large analyte molecules are more prone to absorption, essentially acting like a crystal in some respects. This absorption can influence the second light signal to such a degree that the binding signal cannot be properly computed by the aforementioned algorithm.

Introduced here, therefore, is an approach to programmatically addressing the absorbance of light by analyte molecules whose binding, for example, to an interferometric sensor, is being monitored by an interferometric sensing system. As mentioned above, a first light signal may be shone upon a biolayer over the course of a biochemical test, and the light reflected by the biolayer may form a second light signal that is detectable by a detector of an interferometric sensing system. Through analysis of the second light signal, the second light signal can be deconvolved into a reflection component and an absorbance component. If the principal component of the second light signal is the reflection component, then the aforementioned algorithm (also called the "traditional algorithm") may be employed that "flips" the binding signal, if necessary. If the principal component of the second light signal is the absorbance component, then another algorithm (also called the "absorbance algorithm") may be employed. The absorbance algorithm is discussed in greater detail below.

Definitions

The term "about" means within +10% of the recited value.

The term "analyte-binding molecule" refers to any molecule capable of participating in a binding reaction with an analyte molecule. Examples of analyte-binding molecules include, but are not limited to, (i) antigen molecules, for use in detecting the presence of antibodies specific against that antigen; (ii) antibody molecules, for use in detecting the presence of antigens; (iii) protein molecules, for use in detecting the presence of a binding partner for that protein; (iv) ligands, for use in detecting the presence of a binding partner; and (v) single-stranded nucleic acid molecules, for use in detecting the presence of nucleic acid molecules.

The term "interferometric sensor" refers to any sensing apparatus upon which a biolayer formed to produce an interference pattern. One example of an interferometric sensor is a probe designed to be suspended in a solution containing the sample having the analyte molecules. Another example of an interferometric sensor is a slide with a planar surface upon which a biolayer can be formed over the course of a biochemical test.

The term "probe" refers to a monolithic substrate having as aspect ratio (length-to-width) of at least 2 to 1 with a thin-film layer coated on the sensing side.

The term "monolithic substrate" refers to a solid piece of material having a uniform composition, such as glass, quartz, or plastic, with one refractive index.

The term "waveguide" refers to a device designed to confine and direct the propagation of electromagnetic waves as light. One example of a waveguide is a flexible, transparent fiber made by drawing glass, plastic, or another transparent material to a small diameter (e.g., roughly that of a human hair). These waveguides are commonly called "optical fibers." Another example of a waveguide is a metal tube for channeling ultrahigh-frequency waves. Waveguides could also take the form of ducts or coaxial cables.

Introduction

A. Overview of Interferometric Sensing System

Figure 2A:
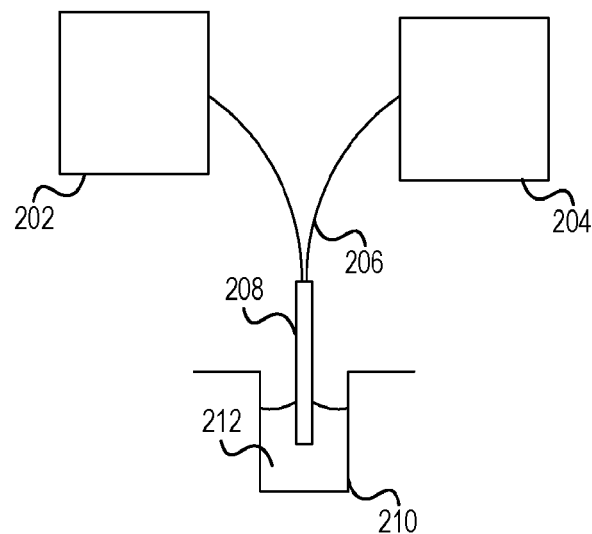
FIG. 2A depicts a biosensor interferometer that includes a light source, a detector, a waveguide, and an optical assembly (also called a "probe").
Figure 2B:
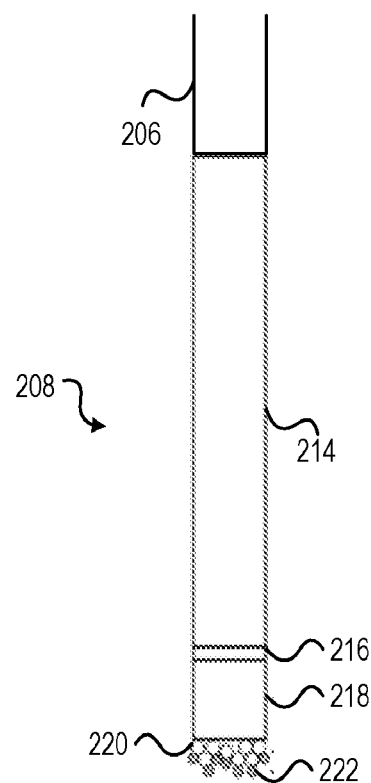
FIG. 2B depicts an example of a probe.

Several entities have developed interferometric sensing systems (also called "interferometers" or simply "systems") designed to conduct biochemical tests. FIGS. 2A-B illustrate one example of such a system. Specifically, FIG. 2A depicts an interferometer 200 that includes a light source 202, a detector 204, a waveguide 206, and an optical assembly 208 (also called a "probe"). The probe 208 may be connected to the waveguide 206 via a coupling medium.

The light source 202 may emit light that is guided toward the probe 208 by the waveguide 206. For example, the light source 202 may be a light-emitting diode (LED) that is configured to produce light over a range of at least 50 nanometers (nm), 200 nm, or 150 nm within a given spectrum (e.g., 400 nm or less to 700 nm or greater). Alternatively, the interferometer 200 may employ a plurality of light sources having different characteristic wavelengths, such as LEDs designed to emit light at different wavelengths in the visible range.—The same function could be achieved by a single light source with suitable filters for directing light with different wavelengths onto the probe 208.

The detector 204 is preferably a spectrometer, such as an Ocean Optics USB4000, that is capable of recording the spectrum of interfering light received from the probe 208. Alternatively, if the light source 202 operates to direct different wavelengths onto the probe 208, then the detector 204 can be a simple photodetector capable of recording intensity at each wavelength. In another embodiment, the detector 204 can include multiple filters that permit detection of intensity at each of multiple wavelengths.

The waveguide 206 can be configured to transport light emitted by the light source 202 to the probe 208, and then transport light reflected by surfaces within the probe 208 to the detector 204. In some embodiments the waveguide 206 is a bundle of optical fibers (e.g., single-mode fiber optic cables), while in other embodiments the waveguide 206 is a multi-mode fiber optic cable.

The probe 208 can include a monolithic substrate 214, a thin-film layer (also referred to as an "interference layer"), and a biomolecular layer (also referred to as a "biolayer") that comprises analyte molecules 222 that have bound to analyte-binding molecules 220. The monolithic substrate 214 comprises a transparent material through which light can travel. The interference layer also comprises a transparent material. When light is shone on the probe 208, the proximal surface of the interference layer may act as a first reflecting surface and the biolayer may act as a second reflecting surface. As further described below, light reflected by the first and second reflecting surfaces may form an interference pattern that can be monitored by the interferometer 200.

The interference layer normally includes multiple layers that are combined in such a manner to improve the detectability of the interference pattern. Here, for example, the interference layer comprises a tantalum pentoxide ($Ta_2O_5$) layer 216 and a silicon dioxide ($SiO_2$) layer 218. The tantalum pentoxide layer 216 may be thin (e.g., about 10-40 nm) since its main purpose is to improve reflectivity at the proximal surface of the interference layer. Meanwhile, the silicon dioxide layer 218 may be comparatively thick (e.g., about 650-900 nm) since its main purpose is to increase the distance between the first and second reflecting surfaces.

To perform a biochemical test, the probe 208 can be suspended in a microwell 210 (or simply "well") that includes a sample 212. Analyte molecules 222 in the sample 212 will bind to the analyte-binding molecules 220 along the distal end of the probe 208 over the course of the biochemical test, and these binding events will result in an interference pattern that can be observed by the detector 204. The interferometer 200 can monitor the thickness of the biolayer formed along the distal end of the probe 208 by detecting shifts in a phase characteristic of the interference pattern. As shown in FIG. 1B, the waveguide 206 may be directly coupled to the probe 208, so as to eliminate any gaps therebetween. For example, in embodiments where the waveguide 206 comprises an optical fiber, the proximal end of the probe 208 can be coupled directly to the optical fiber. As mentioned above, the interferometer 200 is responsible for monitoring the interference pattern caused by light reflecting at the first and second reflecting surfaces of the probe 208.

Note that embodiments of the interferometric sensing system may be described in the context of a probe designed to be suspended within a solution containing a sample for the purpose of illustration. However, those skilled in the art will recognize that these features are equally applicable to other sensing surfaces, such as planar surfaces (e.g., a slide) upon which a biolayer is formed by flowing a solution over the planar surface over the course of a biochemical test.

B Overview of Probe

Figure 3:
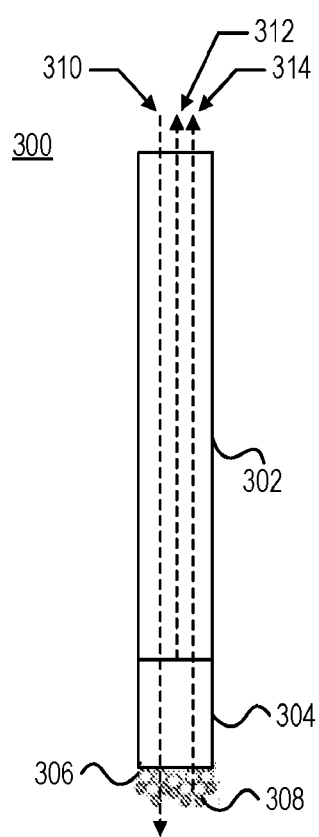
FIG. 3 depicts an example of a probe in accordance with various embodiments.

FIG. 3 depicts an example of a probe 300 in accordance with various embodiments. The probe 300 includes an interference layer 304 that is secured along the distal end of a monolithic substrate 302. Analyte-binding molecules 306 can be deposited along the distal surface of the interference layer 304. Over the course of a biochemical test, a biolayer will form as analyte molecules 308 in a sample bind to the analyte-binding molecules 306.

As shown in FIG. 3, the monolithic substrate 302 has a proximal surface (also referred to as a "coupling side") that can be coupled to, for example, a waveguide of an interferometer and a distal surface (also referred to as a "sensing side") on which additional layers are deposited. Generally, the monolithic substrate 302 has a length of at least 3 millimeters (mm), 5 mm, 10 mm, or 15 mm. In a preferred embodiment, the aspect ratio (length-to-width) of the monolithic substrate 302 is at least 5 to 1. In such embodiments, the monolithic substrate 302 may be said to have a columnar form. The cross section of the monolithic substrate 302 may a circle, oval, square, rectangle, triangle, pentagon, etc. The monolithic substrate 302 preferably has a refractive index that is substantially higher than the refractive index of the interference layer 304, such that the proximal surface of the interference layer 304 effectively reflects light directed onto the probe 300. The preferred refractive index of the monolithic substrate may be higher than 1.5, 1.8, or 2.0. Accordingly, the monolithic substrate 302 may comprise a high-refractive-index material such as glass (refractive index of 2.0), though some embodiments of the monolithic substrate 302 may comprise a low-refractive-index material such as quartz (refractive index of 1.46) or plastic (refractive index of 1.32-1.49).

The interference layer 304 is comprised of at least one transparent material that is coated on the distal surface of the monolithic substrate 302. These transparent material(s) are deposited on the distal surface of the monolithic substrate 302 in the form of thin films ranging in thickness from fractions of a nanometer (e.g., a monolayer) to several micrometers. The interference layer 304 may have a thickness of at least 600 nm, 700 nm, or 900 nm. An exemplary thickness is between 600-5,000 nm (and preferably 800-1, 300 nm). Here, for example, the interference layer 304 has a thickness of approximately 900-1,000 nm, or 940 nm.

In contrast to conventional probes, the interference layer 304 has a substantially similar refractive index as the biolayer. This ensures that the reflection from the distal end of the probe 300 is predominantly due to the analyte molecules 308 rather than the interface between the interference layer 304 and the analyte-binding molecules 306. Generally, the biolayer has a refractive index of approximately 1.36, though this may vary depending on the type of analyte-binding molecules (and thus analyte molecules) along the distal end of the probe 300.

In some embodiments the interference layer 304 is comprised of magnesium fluoride ($MgF_2$), while in other embodiments the interference layer 304 is comprised of potassium fluoride (KF), lithium fluoride (LiF), sodium fluoride (NaF), lithium calcium aluminum fluoride (LiCaAlF$_6$), strontium fluoride (SrF$_2$), aluminum fluoride (AlF$_3$), sulphur hexafluoride (SF$_6$), etc. Magnesium fluoride has a refractive index of 1.38, which is substantially identical to the refractive index of the biolayer formed along the distal end of the probe 300. For comparison, the interference layer of conventional probes is normally comprised of silicon dioxide, and the refractive index of silicon dioxide is approximately 1.4-1.5 in the visible range. Because the interference layer 304 and biolayer have similar refractive indexes, light will experience minimal scattering as it travels from the interference layer 304 into the biolayer and then returns from the biolayer into the interference layer 304.

During a biochemical test, the probe 300 can be suspended within a cavity (e.g., a well) that includes a sample. Over the course of the biochemical test, a biolayer will form along the distal end of the probe 300 as analyte molecules 308 bind to the analyte-binding molecules 306. When light is shone on the probe 300, the proximal surface of the interference layer 304 may act as a first reflecting surface and the distal surface of the biolayer may act as a second reflecting surface. The presence, concentration, or binding rate of analyte molecules 308 to the probe 300 can be estimated based on the interference of beams of light reflected by these two reflecting surfaces. As analyte molecules 308 attach to (or detach from) the analyte-binding molecules 306, the distance between the first and second reflecting surfaces will change. Because the dimensions of all other components in the probe 300 remain the same, the interference pattern formed by the light reflected by the first and second reflecting surfaces is phase shifted in accordance with changes in biolayer thickness due to binding events.

In operation, an incident light signal 310 emitted by a light source is transported through the monolithic substrate 302 toward the biolayer. Within the probe 300, light will be reflected at the first reflecting surface resulting in a first reflected light signal 312. Light will also be reflected at the second reflecting surface resulting in a second reflected light signal 314. The second reflecting surface initially corresponds to the interface between the analyte-binding molecules 306 and the sample in which the probe 300 is immersed. As binding occurs during the biochemical test, the second reflecting surface becomes the interface between the analyte molecules 308 and the sample.

Figure 5B:
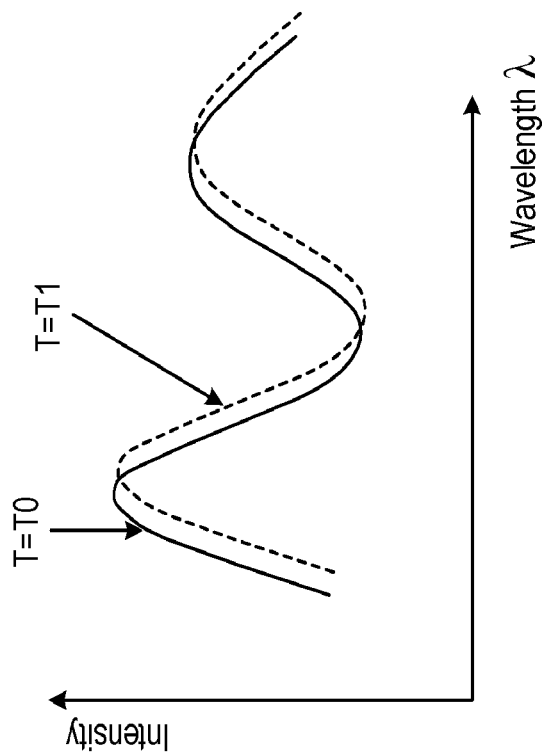
FIGS. 5A-B illustrate the principles of detection in a thin-film interferometer.
Figure 5A:
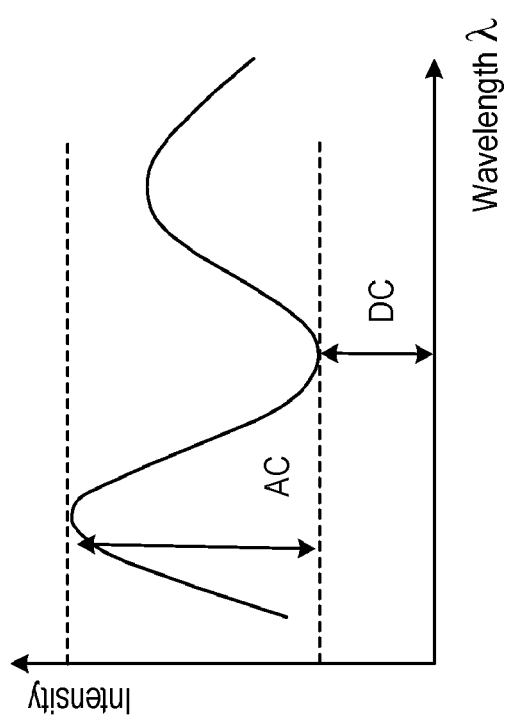

The first and second reflected light signals 312, 314 form a spectral interference pattern as shown in FIG. 5A. When analyte molecules 308 bind to the analyte-binding molecules 306 on the distal surface of the interference layer 304, the optical path of the second reflected light signal 314 will lengthen. As a result, the spectral interference pattern shifts from T0 to T1 as shown in FIG. 5B. By measuring the phase shift continuously in real time, a kinetic binding curve can be plotted as the amount of shift versus the time. The association rate of an analyte molecule to an analyte-binding molecule immobilized on the distal surface of the interference layer 304 can be used to calculate analyte concentration in the sample. Hence, the measure of the phase shift is the detection principle of a thin-film interferometer.

Figure 4:
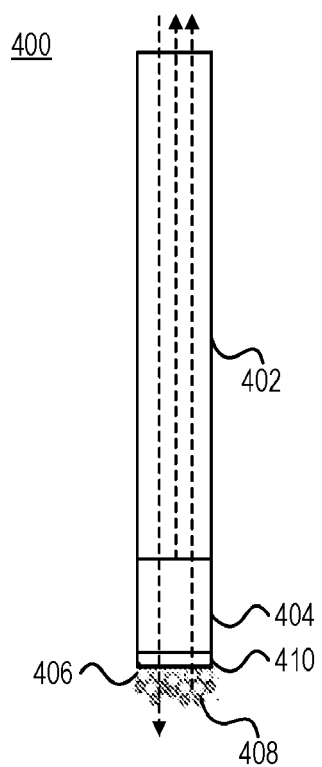
FIG. 4 depicts another example of a probe in accordance with various embodiments.

FIG. 4 depicts another example of a probe 400 in accordance with various embodiments. Probe 400 of FIG. 4 may be substantially similar to probe 300 of FIG. 3. Here, however, the probe 400 includes an adhesion layer 410 that is deposited along the distal surface of the interference layer 404 affixed to the monolithic substrate 402. While the interference layer 404 is present in most embodiments, the adhesion layer 404 is generally optional, and therefore may only be included if greater adhesion of analyte-binding molecules 406 is desired or needed.

The adhesion layer 410 may comprise a material that promotes adhesion of the analyte-binding molecules 406. One example of such a material is silicon dioxide. The adhesion layer 410 is generally very thin in comparison to the interference layer 404, so its impact on light traveling toward, or returning from, the biolayer will be minimal. For example, the adhesion layer 410 may have a thickness of approximately 3-10 nm, while the interference layer 404 may have a thickness of approximately 800-1,000 nm. The biolayer formed by the analyte-binding molecules 406 and analyte molecules 408 will normally have a thickness of several nm. Much like probe 300 of FIG. 3, probe 400 of FIG. 4 may also have a reflection layer (not shown) deposited along the distal end of the monolithic substrate 402 such that the reflection layer is positioned between the monolithic substrate 402 and interference layer 404. The thickness of the reflection layer may be about the same as the thickness of the adhesion layer 410.

As mentioned above, these features are equally applicable to sensing surfaces having other forms. One example of such a sensing surface is a slide (also referred to as a "chip") with a planar surface upon which a biolayer is formed by flowing a solution over the planar surface over the course of a biochemical test. Several examples of planar surfaces are discussed below with reference to FIGS. 6-7.

Figure 6:
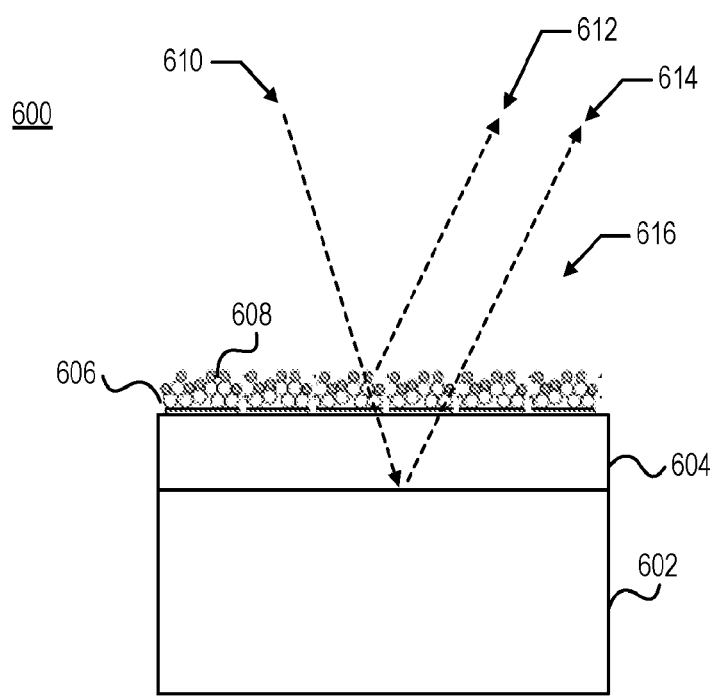
FIG. 6 depicts an example of a slide in accordance with various embodiments.

FIG. 6 depicts an example of a slide 600 in accordance with various embodiments. The slide 600 includes a substrate 602 upon which an interference layer 604 is deposited. In some embodiments the interference layer 604 is deposited along the entire upper surface of the substrate 602, while in other embodiments the interference layer 604 is deposited along a portion of the upper surface of the substrate 602. For example, the interference layer 604 may be deposited within channels or wells formed within the upper surface of the substrate 602. As discussed above, monolithic substrates 302, 402 of FIGS. 2-3 are generally much larger in height than in width. Here, however, the inverse may be true. In fact, the width of the substrate 602 may be larger than the length by a factor of 5, 7.5, 10, or 20. As an example, the substrate may be approximately 75 by 26 mm with a height/thickness of roughly 1 mm.

Over the course of a biochemical test, analyte molecules 608 can bind to analyte-binding molecules 606 that have been secured along the upper surface of the interference layer 604 to form a biolayer. To establish the thickness of the biolayer, light can be shone at the upper surface of the slide 600 as shown in FIG. 6. More specifically, an incident light signal 20610 emitted by a light source can be shown at the biolayer that has formed along the upper surface of the slide 600. This may require that the incident light signal 20610 travel through ambient media 616, which may be vacuum, air, or solution. The incident light signal 20610 will be reflected at a first reflecting surface resulting in a first reflected light signal 612. The first reflecting surface may be representative of the interface between the biolayer and ambient media 616. The incident light signal 20610 will also be reflected at a second reflecting surface resulting in a second reflected light signal 614. The second reflecting surface may be representative of the interface between the interference layer 604 and substrate 602. As discussed above, the first and second reflected light signals 612, 614 form a spectral interference pattern that can be analyzed to establish the thickness of the biolayer. Note that because the incident light signal 20610 is not transported through the substrate 602, the substrate 602 could be either transparent or non-transparent (e.g., opaque).

Figure 7:
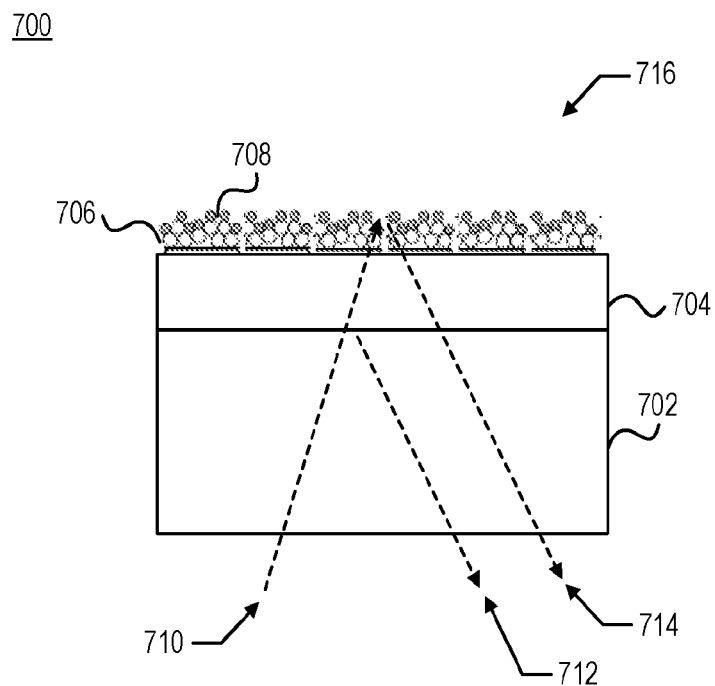
FIG. 7 depicts another example of a slide in accordance with various embodiments.

FIG. 7 depicts another example of a slide 700 in accordance with various embodiments. Slide 700 of FIG. 7 may be largely similar to slide 600 of FIG. 6. Thus, the slide 700 may include a substrate 702 upon which an interference layer 704 and analyte-binding molecules 706 are deposited. Over the course of a biochemical test, analyte molecules 708 can bind to the analyte-binding molecules 706 to form a biolayer.

Here, however, the incident light signal 710 is shown at the lower surface of the slide 700. In operation, the incident light signal 710 is transported through the substrate 702 toward the biolayer. Within the slide 700, light will be reflected at a first reflecting surface resulting in a first reflected light signal 712. The first reflecting surface may be representative of the interface between the interference layer 704 and substrate 702. Light will also be reflected at a second reflecting surface resulting in a second reflected light signal 714. The second reflecting surface may be representative of the interface between the biolayer and ambient media 716. As discussed above, the first and second reflected light signals 712, 714 form a spectral interference pattern that can be analyzed to establish the thickness of the biolayer.

While not shown in FIGS. 6-7, the slides 600, 700 could include a reflection layer that is disposed between the substrate 602, 702 and interference layer 604, 704 to improve reflectivity along that interface and/or an adhesion layer that is disposed along the upper surface of the interference layer 604, 704 to secure the analyze-binding molecules 606, 706.

Addressing Light Absorbance During Interferometric Testing

Figure 8:
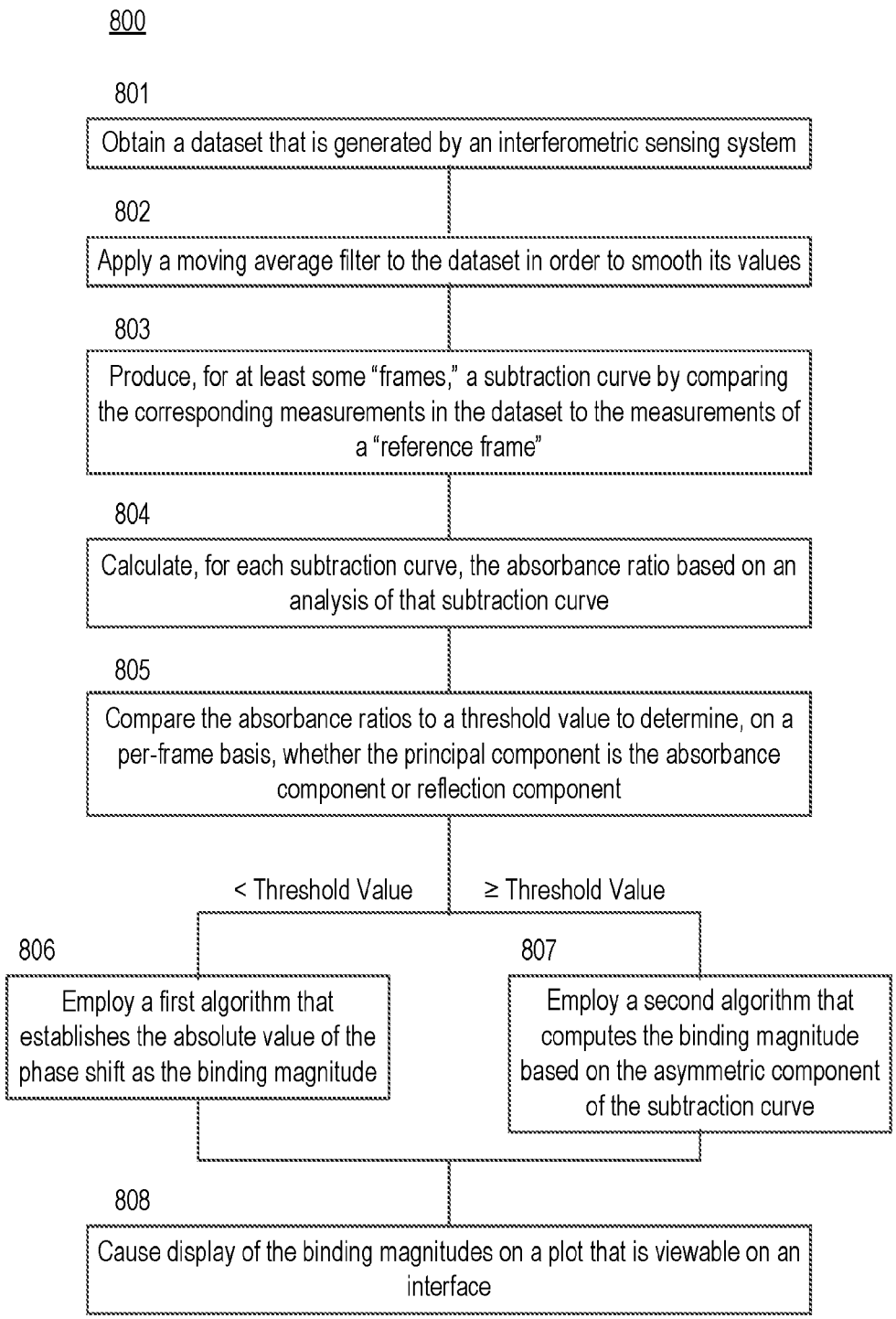
FIG. 8 depicts a flow diagram of a process for addressing the absorbance of light by analyte molecules whose binding activities are being monitored by an interferometric sensing system.

FIG. 8 depicts a flow diagram of a process 800 for addressing the absorbance of light by analyte molecules whose binding activities are being monitored by an interferometric sensing system. Normally, the process 800 is carried out by a computer program that is executing on the interferometric sensing system. Thus, the process 800 may be implemented through the executing of corresponding instructions by a processor contained in the interferometric sensing system.

Alternatively, the process 800 could be carried out by a computer program that is executed by a processor located external to the interferometric sensing system. This implementation is further discussed below with reference to FIGS. 10-11. This "external processor" could be contained in a computing device that is communicatively connectable to the interferometric sensing system. Examples of computing devices include mobile phones, tablet computers, laptop computers, and network-accessible server systems comprised of one or more computer servers.

Initially, the computer program can obtain a dataset that is generated by the interferometric sensing system (step 801). Specifically, the dataset is generated by the detector of the interferometric sensing system, and therefore the data contained therein may be referred to as "detector data" or "scope data." The detector can measure the intensity across a set of wavelengths at a given point in time, as shown in FIG. 5A. This set of measurements may be referred to as a "signal" or "frame." Because growth of the biolayer along the surface of the interferometric sensor is generally evidenced by a phase shift in the optical interference pattern, the detector may generate frames corresponding to different points in time. These frames may be continually or periodically generated by the detector.

In some embodiments, the dataset obtained by the computer program includes measurements associated with more than one frame. For example, measurements may be obtained in batches, where each batch includes the measurements generated for at least two frames, in order to save on computational resources. Thus, the computer program may periodically acquire measurements generated by the detector. In other embodiments, the measurements are obtained by the computer program in real time, for example, in the form of a signal waveform (or simply "signal" or "waveform") that is representative of a sequential order of discrete values corresponding to different wavelengths. Thus, the computer program may acquire measurements on a rolling basis as those measurements are generated by the detector.

In some embodiments, the computer program applies a moving average filter to the dataset in order to smooth its values (step 802). Specifically, the computer program may generate a moving average filter by selecting a boxcar function as the impulse response of a filter, and then the computer program may apply the moving average filter to the dataset in order to compute a moving average of the measurements. The term "moving average" refers to a calculation to analyze data points—say, the measurements associated with a given frame—by creating a series of averages of different subsets of those data points. At a high level, computing the moving average may be helpful to smooth short-term fluctuations and highlight longer-term trends, as the goal may be to produce a form comparable to the signal shown in FIG. 5A to allow for easier determination of the phase shift.

Thereafter, the computer program can produce, for at least some of the "frames," a subtraction curve by comparing the corresponding measurements to the measurements of a "reference frame" (step 803). Accordingly, the computer program may produce a series of subtraction curves, each of which is representative of the difference computer between the corresponding frame and the "reference frame." While the "reference frame" may be established as the beginning of a biochemical test, it need not be the first frame generated by the detector. For example, the "reference frame" may be the first frame that is generated following the conclusion of an initiation phase in which the signal is allowed to become less noisy. The initiation phase may last for a predetermined number of frames (e.g., 100, 500, 1,000, or 2,500 frames), or the initiation phase may last until a determination is made—for example, by the computer program through analysis of frames—that the noise is sufficiently low. Alternatively, the initiation phase may last for a predetermined amount of time (e.g., 0.25, 0.50, 1.00, or 2.50 seconds). At a high level, the "reference frame" may be indicative of the beginning of the biochemical test, where it is assumed that minimal binding has occurred.

For each subtraction curve included in the series of subtraction curves, the computer program can then calculate the absorbance ratio based on an analysis of that subtraction curve (step 804). To accomplish this, the computer program may decompose the subtraction curve into its antisymmetric component and asymmetric component as further discussed below. The asymmetric component may be representative of the absorbance component, while the antisymmetric component may be representative of the reflection component. To calculate the absorbance ratio, the computer program can compare the absorbance component to the measurable signal as a whole, as follows:

$$\text{Ratio}_{Absorbance} = \frac{\text{Absorbance Component}}{\text{Absorbance Component} + \text{Reflection Component}}. \quad \text{Eq. 1}$$

The computer program can then compare the absorbance ratios to a threshold value to determine, on a per-frame basis, whether the principal component is the absorbance component or reflection component (step 805). As an example, the computer program may determine whether the absorbance ratio indicates that the absorbance component is at least 50 percent of the measurable signal as a whole.

In the event that a given absorbance ratio is less than the threshold value, the computer program can determine that the principal component is the reflection component representative of phase shift. In such a scenario, the computer program can employ a first algorithm that computes the appropriate value for the binding curve so as to have the absolute value of the phase shift as the binding magnitude (step 806). Thus, the first algorithm may compute the binding curve in the traditional manner.

In the event that a given absorbance ratio is greater than the threshold value, the computer program can determine that the principal component is the absorbance component. In such a scenario, the computer program can employ a second algorithm that computes the appropriate value for the binding curve based on the asymmetric component of the subtraction curve (step 807).

Thereafter, the computer program can cause display of the binding magnitudes on a plot that is viewable on an interface (step 808). Generally, the interface is presented by, and viewed on, the interferometric sensing system. However, the interface could be presented by, and viewed on, another computing device. The computer program may be executing on this other computing device, or the computer program may send the necessary data to this other computing device for display. Examples of computing devices incudes mobile phones, tablet computers, laptop computers, and the like.

Note that, in some embodiments, these computations are done on a per-frame basis in order to maximize accuracy. In other embodiments, these computations may be done on a set of frames to conserve computational resources or calculate the binding curve more promptly. Performance of the process 800 can result in the production of two outputs. The first output is the respective ratio of the absorbance component and reflection component in the measurable signal, as determined based on the subtraction curve calculated for the current frame with respect to the reference frame. The second output is the quantitative magnitude of absorbance, which is related to the amount of binding on the interferometric sensor. As mentioned above, the computer program may decide whether the principal component of the measurable signal is the absorbance component or reflection component. Rather than on a per-frame basis, the computer program may do this for a set of frames as part of an experiment operation. For example, the computer program may determine whether the absorbance component or reflection component is the principal component across 25, 50, 100, or 500 "frames." Then, the binding curve—and more specifically, the binding magnitude over time—can be calculated based on the decomposed principal component of the measured signal.

Additional Information Regarding Absorbance Computation

For the purpose of illustration, aspects of the process described above with reference to FIG. 8 are further discussed below. This illustrative example is not intended to limit the process in any way.

One of the core responsibilities of the computer program is to calculate subtraction curves for frames generated by the detector. As mentioned above, a subtraction curve can be calculated through an analysis of two frames, namely, a frame of interest and a reference frame, as follows:

$$\text{Magnitude}_n(i) = \text{Frame}_n(i) - \text{Frame}_{Ref}(i), \quad \text{Eq. 2}$$

where i extends from 1 to an integer N (e.g., 3,648) that is representative of the resolution of the detector and n is the index of the frame of interest. Note that because the detector is commonly a spectrometer, the term "frame" may be used interchangeably with the term "scope." Thus, Eq. 2 could also be written as:

$$\text{Magnitude}_n(i) = \text{Scope}_n(i) - \text{Scope}_{Ref}(i). \quad \text{Eq. 3}$$

Figure 9:
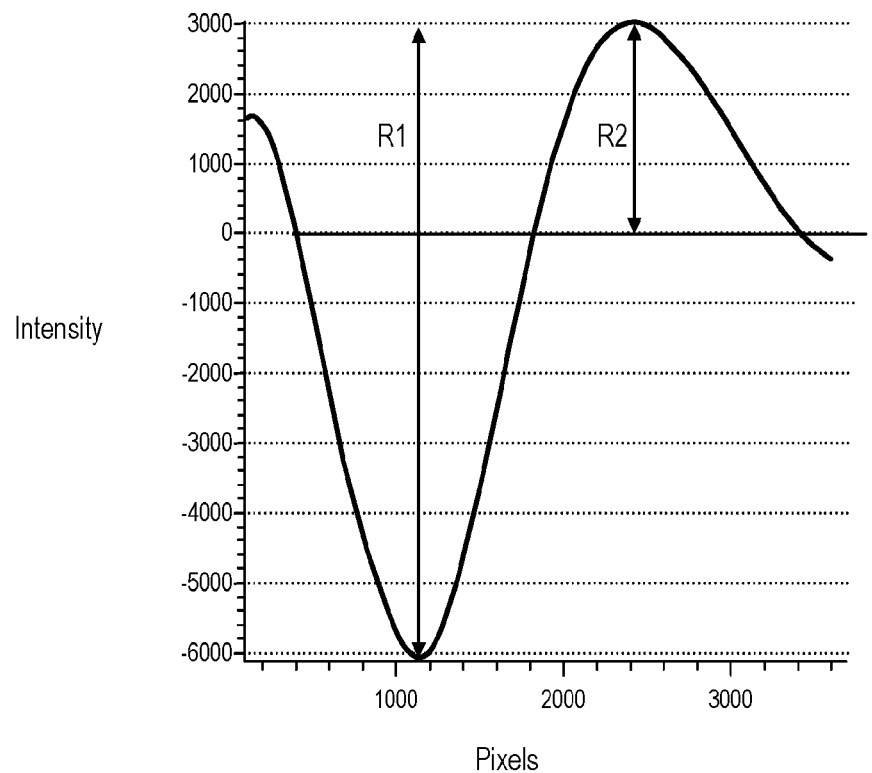
FIG. 9 illustrates how the magnitude of the full signal—indicated using R1—and half of the magnitude of the antisymmetric signal—indicated using R2—can be determined through analysis of the subtraction curve.

The computer program can then decompose the subtraction curve—generally in the form of a sinusoidal wave—into its antisymmetric component and asymmetric component. The antisymmetric component is representative of phase shift due to reflection, while the asymmetric component is representative of absorbance. With these components, the computer program can obtain the ratios of absorbance and phase shift in terms of the measured signal. FIG. 9 illustrates how the magnitude of the full signal—indicated using R1—and half of the magnitude of the antisymmetric signal—indicated using R2—can be determined through analysis of the subtraction curve. In FIG. 9, the x-axis unit is pixels—representing wavelength where 1 pixel is equal to roughly 0.05-0.08 nm—while the y-axis unit is indicative of intensity. Each magnitude along the y-axis indicates the relative intensity of the corresponding wavelength. After determining R1 and R2, the absorbance ratio and phase shift ratio can be computed as follows:

$$\text{Ratio}_{Absorbance} = \frac{R1 - 2 \times R2}{R1} \quad \text{Eq. 4}$$

$$\text{Ratio}_{PhaseShift} = 1 - \text{Ratio}_{Absorbance} \quad \text{Eq. 5}$$

These operations may be repeatedly performed by the computer program on a set of frames as part of an experiment operation. For example, the computer program may evaluate 50, 100, or 250 frames after the starting phase of one reaction is complete to avoid noise. Then, the computer program can compare the average absorbance ratio computed for those frames in the window of interest to a threshold value. If the average absorbance ratio (AAR) is larger than the threshold value, then the computer program can assign the experiment operation to the absorbance category as indicated below:

$$\text{StepType} = \begin{cases} \text{Absorption if } AAR \text{ for frames} \geq \text{threshold value} \\ \text{Phase shift if } AAR \text{ for frames} < \text{threshold value} \end{cases} \quad \text{Eq. 6}$$

In the event that the experiment operation is assigned to the absorbance category, the computer program can calculate the binding magnitude at a given point in time based on the asymmetry component in the subtraction curve, which shows the difference between the corresponding frame and reference frame. The reference frame may be the first frame generated as part of the experiment operation, for example. Referring again to FIG. 9, the binding magnitude can be calculated as follows:

$$\text{Magnitude}_{Binding} = \text{Coefficient} \times \sqrt{\frac{R1 - 2 \times R2}{\text{Average of Frame}}}. \qquad \text{Eq. 6}$$

Here, the asymmetric component—namely, R1–2×R2—is initially divided by an average of at least some pixels of the current frame to reduce noise. Specifically, the asymmetric component can be divided by an average of the frame to nondimensionalize the intensity and then transfer that value to a variation factor. The computer program may choose a certain range of pixels to minimize the randomness, in effect mimicking the boxcar principle. Thereafter, the computer program can find the root of that value and then multiply by a constant coefficient. The computer program may determine the coefficient based on the absorption of the immobilized antibody molecules. Generally, the coefficient is selected to be quite consistent among most biomolecules, though the coefficient could be adjusted for extreme cases.

In the event that the experiment operation is assigned to the phase shift category (also called the "reflectance category"), the computer program can calculate the cross-correlation value to establish the binding magnitude. At a high level, cross-correlation captures the wavelength shift along the x-axis for a given measurement by monitoring the peak of the sinusoidal curve.

Overview of Centrally Hosted Computer Program

As mentioned above, aspects of the approaches introduced here could be implemented by a computer program that is executed by an interferometric sensing system. As mentioned above, the computer program could alternatively be executed by a processor located external to the interferometric sensing system. This "external processor" could be contained in a computing device that is communicatively connectable to the interferometric sensing system. Regardless of whether the computer program is internal or external to the interferometric sensing system, the computer program may be part of an interferometric analysis platform (or simply "analysis platform"). In addition to processing data generated by the interferometric sensing system, the analysis platform may be responsible for facilitating the designing, conducting, or documenting of biochemical tests.

Figure 10:
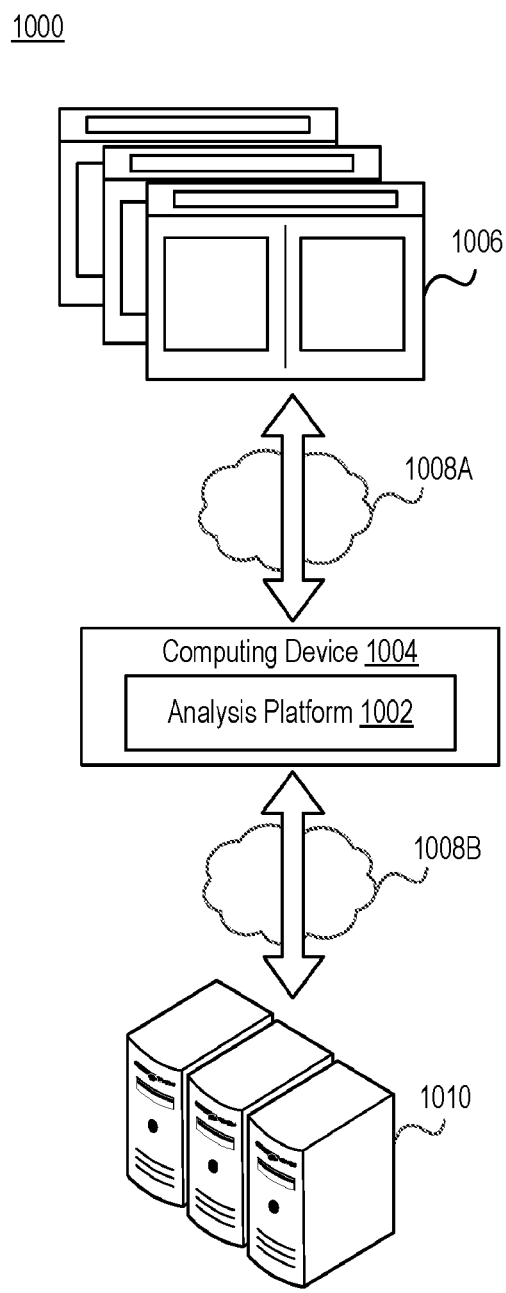
FIG. 10 illustrates a network environment that includes an analysis platform that is executed by a computing device.

FIG. 10 illustrates a network environment 1000 that includes an analysis platform 1002 that is executed by a computing device 1004. An individual (also called a "user") may be able to interact with the analysis platform 1002 via interfaces 1006. For example, a user may be able to access an interface through which characteristics of a biochemical test (e.g., the type of analyte-binding molecule or analyte molecule, the runtime, the reagents) are specified. As another example, a user may be able to access an interface through which data generated by an interferometric sensing system—or analyses of that data—can be reviewed.

As shown in FIG. 10, the analysis platform 1002 may reside in a network environment 1000. Thus, the computing device 1004 on which the analysis platform 1002 resides may be connected to one or more networks 1008A-B. Depending on its nature, the computing device 1004 could be connected to a personal area network (PAN), local area network (LAN), wide area network (WAN), metropolitan area network (MAN), or cellular network. For example, if the computing device 1004 is a computer server, then the computing device 1004 may be accessible to users via respective computing devices that are connected to the Internet via LANs.

The interfaces 1006 may be accessible via a web browser, desktop application, or mobile application. For example, to interact with the analysis platform 1002, a user may initiate a web browser on the computing device 1004 and then navigate to a web address associated with the analysis platform 1002. As another example, a user may access, via a desktop application, interfaces that are generated by the analysis platform 1002 through which she can select data for analysis, review analyses of the data, and the like. Accordingly, interfaces generated by the analysis platform 1002 may be accessible to various computing devices, including mobile phones, tablet computers, desktop computers, and the like. Interfaces generated by the analysis platform 1002 could even be accessible on the interferometric sensing system responsible for generating the data. In such embodiments, the interferometric sensing system may transmit data generated over the course of a biochemical test to another computing device for processing by the analysis platform 1002, and then the analysis platform 1002 may transmit the processed data—or analyses of the processed data—to the interferometric sensing system for display.

Generally, the analysis platform 1002 is executed by a cloud computing service operated by, for example, Amazon Web Services®, Google Cloud Platform™, or Microsoft Azure®. Thus, the computing device 1004 may be representative of a computer server that is part of a server system 1010. Often, the server system 1010 is comprised of multiple computer servers. These computer servers can include different types of data (e.g., information regarding patients, such as demographic information and health information), algorithms for processing, presenting, and analyzing the data, and other assets. Those skilled in the art will recognize that this data could also be distributed among the server system 1010 and computing devices. For example, sensitive information associated with a patient whose sample is being examined may be stored on, and initially processed by, an interferometric sensing system, such that the sensitive information is obfuscated or removed before the data is transmitted to the server system 1010 for further processing.

As mentioned above, aspects of the analysis platform 1002 could be hosted locally, for example, in the form of a computer program executing on an interferometric sensing system, mobile phone, laptop computer, or desktop computer. Several different versions of the analysis platform 1002 may be available depending on the intended use. Assume, for example, that a user would like to actively guide or document biochemical tests in which the data is generated by the interferometric sensing system. In such a scenario, the computer program may allow for the selection or specification of patients, types of biochemical test, lengths of different test stages, types of reagents, types of analyte-binding molecules, types of analyte molecules, etc. Alternatively, if the user is interested in simply reviewing analyses of data generated by the interferometric sensing system, the analysis platform 1002 may be "simpler."

Figure 11:
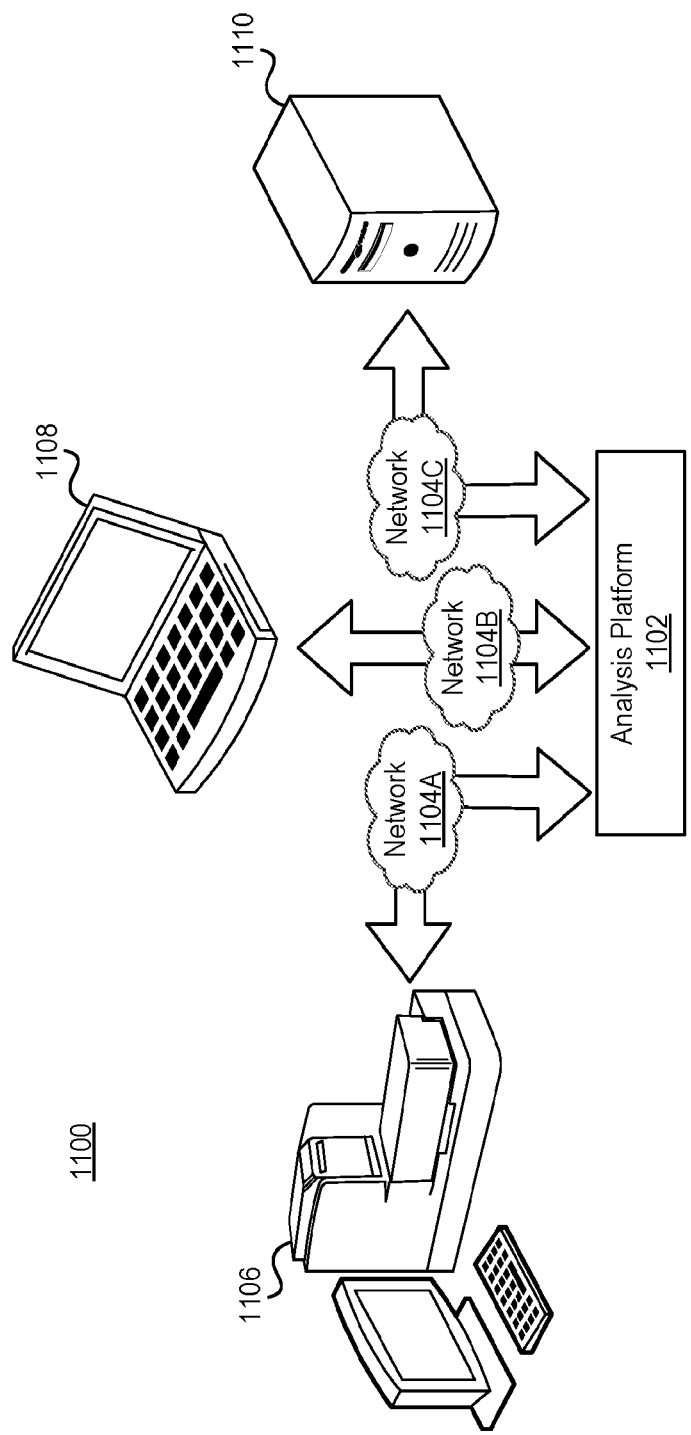
FIG. 11 depicts an example of a communication environment that includes an analysis platform configured to acquire data from one or more sources.

FIG. 11 depicts an example of a communication environment 1100 that includes an analysis platform 1102 configured to acquire data from one or more sources. Here, the analysis platform 1102 may receive data from an interferometric sensing system 1106, laptop computer 1104, or network-accessible server system 1110 (collectively referred to as the "networked devices"). For example, the analysis platform 1102 may obtain data from the interferometric sensing system 1106 that is generated by its detector (e.g., spectrometer) over the course of a biochemical test and information regarding the biochemical test or corresponding patient from the network-accessible server system 1110 or laptop computer 1108. Note that the analysis platform 1102 can, and often will, obtain data from more than one interferometric sensing system. For example, the analysis platform 1102 may obtain data from interferometric sensing systems located in different geographical locations (e.g., in different healthcare facilities, research facilities, etc.).

The networked devices can be connected to the analysis platform 1102 via one or more networks 1104A-C. The networks 1104A-C can include PANS, LANs, WANS, MANs, cellular networks, the Internet, etc. Additionally or alternatively, the networked devices may communicate with one another over a short-range wireless connectivity technology. For example, if the analysis platform 1102 resides on the network-accessible server system 1110, data received from the network-accessible server system 1110 need not traverse any networks. However, the network-accessible server system 1110 may be connected to the interferometric sensing system 1106 and laptop computer 1108 via separate Wi-Fi communication channels. As another example, if the analysis platform 1102 resides on the interferometric sensing system 1106, data generated by the interferometric sensing system 1106 may not need to traverse any networks. However, the interferometric sensing system 1106 may be connected to the network-accessible server system 1110 via a Wi-Fi communication channel and the laptop computer 1108 via a short-range communication channel established in accordance with the Bluetooth® communication protocol, Wi-Fi Direct® communication protocol, near-field communication (NFC) communication protocol, or the like.

Embodiments of the communication environment 1100 may include a subset of the networked devices. For example, some embodiments of the communication environment 1100 include an analysis platform 1102 that receives data from the interferometric sensing system 1106 and additional data from the network-accessible server system 1110 on which it resides. In such embodiments, a user may be able to interact with the analysis platform 1102 via a display and corresponding control device that are part of, or connected to, the interferometric sensing system 1106. As another example, some embodiments of the communication environment 1100 include an analysis platform 1102 that receives data from a series of interferometric sensing systems located in different environments (e.g., different clinics, research facilities, testing facilities, etc.).

Processing System

Figure 12:
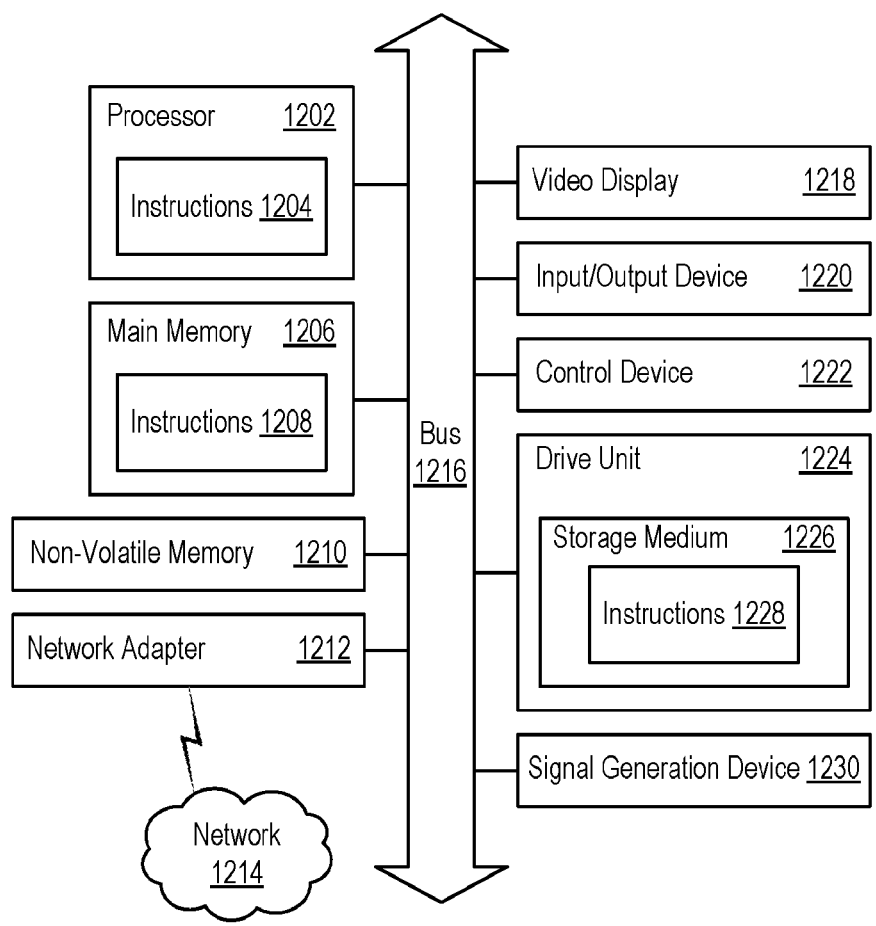
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on an interferometric sensing system, or components of the processing system 1200 may be hosted on a computing device that can be communicatively connected to the interferometric sensing system or a storage medium in which data generated by the interferometric sensing system is stored—at least temporarily.

The processing system 1200 may include a processor 1202, main memory 1206, non-volatile memory 1210, network adapter 1212, video display 1218, input/output device 1220, control device 1222 (e.g., a keyboard or pointing device), drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport bus, an industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 1210, and storage medium 1226 are shown to be a single medium, the terms "machine-readable medium" and "storage medium" should be taken to include a single medium or multiple media (e.g., a centralized/distributed database and/or associated caches and servers) that store one or more sets of instructions 1228. The terms "machine-readable medium" and "storage medium" shall also be taken to include any medium that is capable of storing, encoding, or carrying a set of instructions for execution by the processing system 1200.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computing device. When read and executed by the processors 1202, the instruction(s) cause the processing system 1200 to perform operations to execute elements involving the various aspects of the present disclosure.

Further examples of machine- and computer-readable media include recordable-type media, such as volatile memory devices and non-volatile memory devices 1210, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

EXAMPLES

Example 1. Data Output for CXCR4 Lipoparticles

Streptavidin coated probe was functionalized with 50 µg/mL biotin-WGA lectin (Vector Laboratories B-1025-5) in PBS. The WGA functionalized probe was then loaded with CXCR4 lipoparticles (Integral Molecular LEV-101) at 8 µg/mL for 30 minutes. After a brief wash step, the CXCR4-loaded probe was exposed to 15 nM CXCR4 antibody (R&D Systems MAB170) for 5 minutes, before a 5-minute dissociation step. The binding data was collected on a GatorPrime (Gator Bio Inc.) instrument, and the results were processed using the CC or the new absorbance algorithm. The results are shown in FIG. 13.

Figure 13:
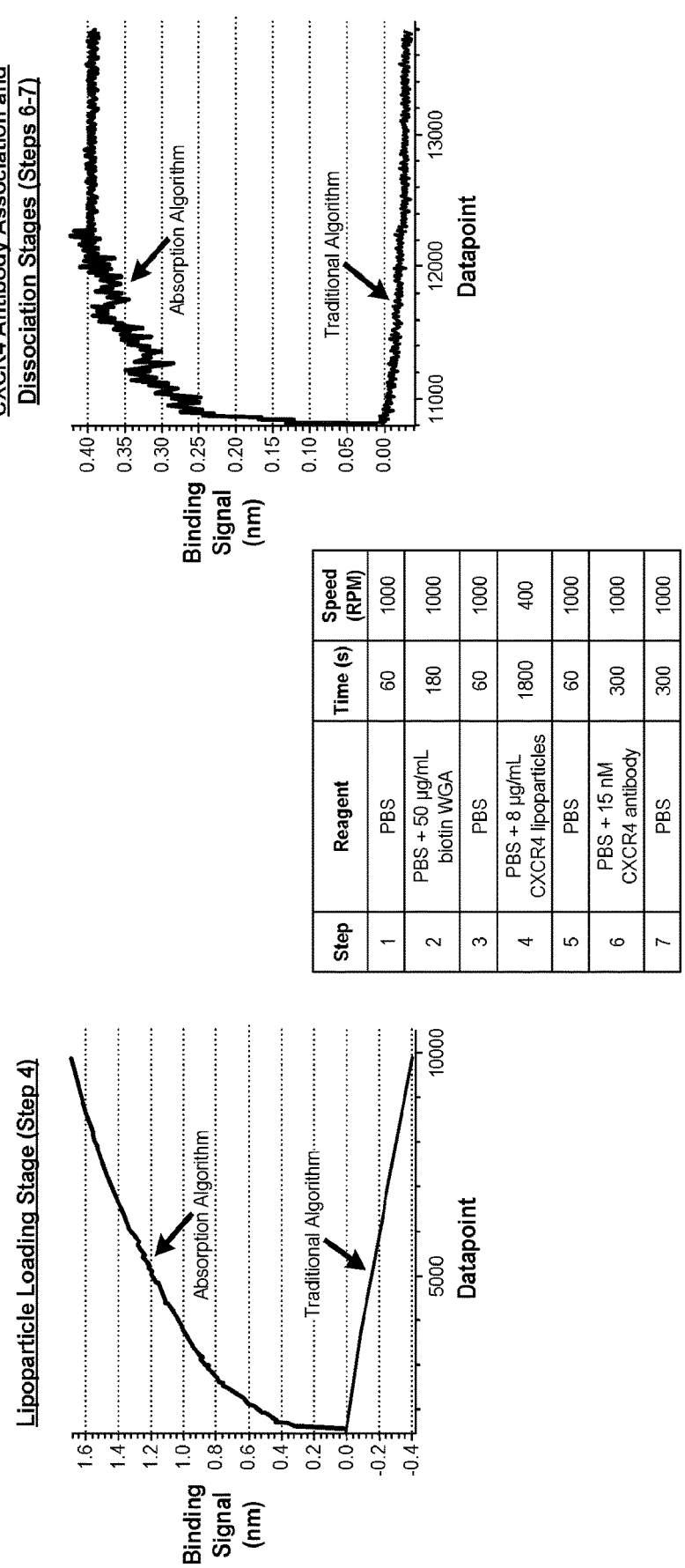
FIG. 13 includes a plot with binding curves computed for the lipoparticle loading stage and antibody association and dissociation stages of an experiment involving CXCR4 lipoparticles.

FIG. 13 includes a plot with two binding curves computed for the lipoparticle loading stage of the aforementioned experiment. These binding curves include a first binding curve computed entirely with the traditional algorithm and a second binding curve computed with the absorbance algorithm. As can be seen in FIG. 13, the second binding curve more clearly indicates continues growth of the biolayer, whereas the first binding curve appears to indicate that the biolayer is decreasing in thickness.

FIG. 13 also includes a plot with two binding curves computed for the CXCR4 antibody association and dissociation stages. Again, these binding curves include a first binding curve computed entirely with the traditional algorithm and a second binding curve computed with the absorbance algorithm. As can be seen in FIG. 13, the second binding curve more clearly indicates the growth and stabilization of the biolayer, whereas the first binding curve appears to indicate that the biolayer continues to decrease in thickness—initially more quickly and then more slowly.

Example 2. Data Output for CD20 Lipoparticles

Streptavidin coated probe was functionalized with 50 µg/mL biotin-WGA lectin (Vector Laboratories B-1025-5) in PBS. The WGA functionalized probe was then loaded with CD20 lipoparticles (Integral Molecular LEV-103) at 20 µg/mL for 30 minutes. After a brief wash step, the CXCR4-loaded probe was exposed to 100 nM CD20 antibody (R&D Systems MAB4225) for 5 minutes, before a 5-minute dissociation step. The binding data was collected on a GatorPrime (Gator Bio Inc.) instrument, and the results were processed using the CC or the new absorbance algorithm. The results are shown in FIG. 14.

Figure 14:
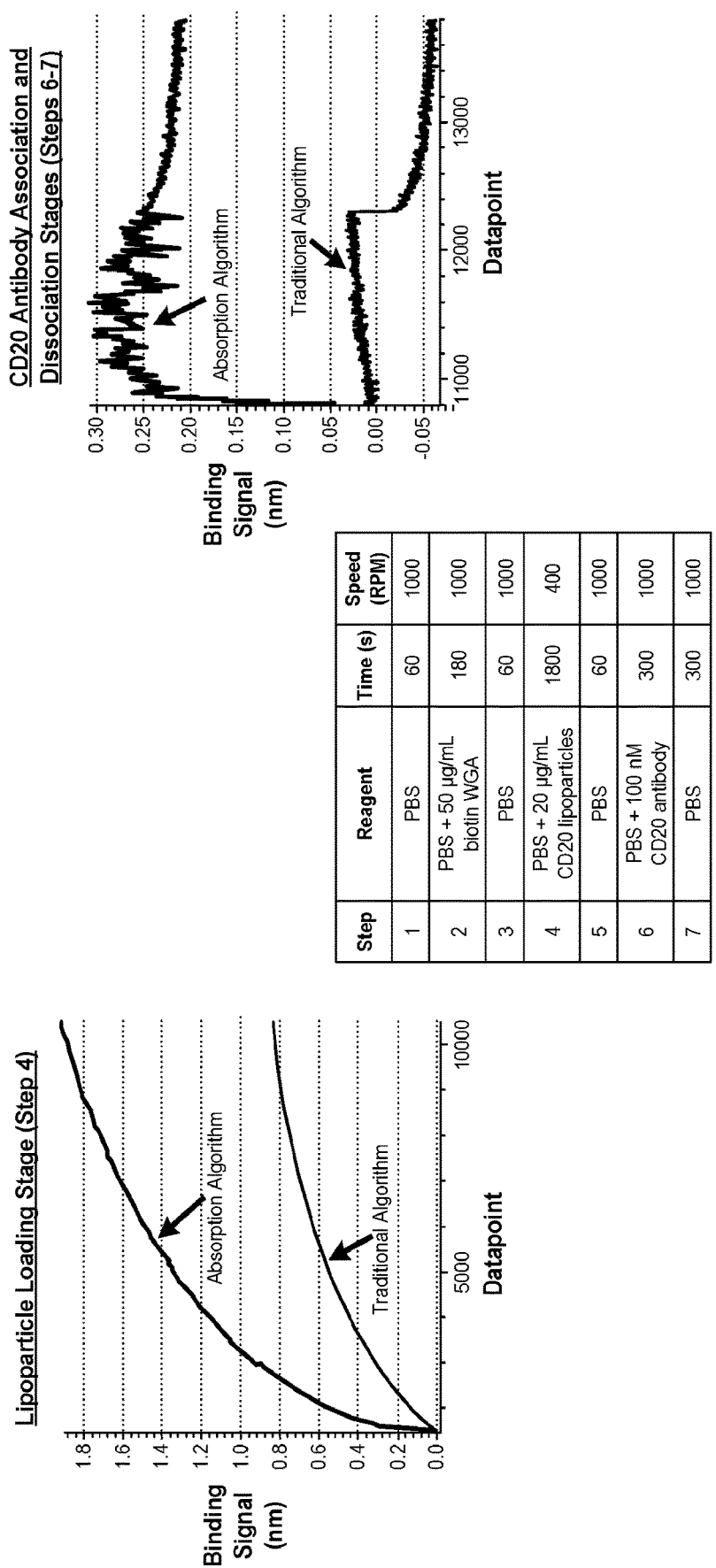
FIG. 14 includes a plot with binding curves computed for the lipoparticle loading stage and antibody association and dissociation stages of an experiment involving CD20 lipoparticles.

FIG. 14 includes a plot with two binding curves computed for the lipoparticle loading stage of the aforementioned experiment. These binding curves include a first binding curve computed entirely with the traditional algorithm and a second binding curve computed with the absorbance algorithm. As can be seen in FIG. 14, the second binding curve indicates more growth of the biolayer than is detected by the traditional algorithm.

FIG. 14 also includes a plot with two binding curves computed for the CD20 antibody association and dissociation stages. Again, these binding curves include a first binding curve computed entirely with the traditional algorithm and a second binding curve computed with the absorbance algorithm. As can be seen in FIG. 14, the second binding curve more clearly indicates the association and dissociation—leading to changes in the thickness of the biolayer—in comparison to the first binding curve that simply indicates roughly constant growth and then rapid breakdown of the biolayer.

REMARKS

The foregoing description of various embodiments of the technology has been provided for the purposes of illustration and description. It is not intended to be exhaustive or to limit the claimed subject matter to the precise forms disclosed.

Many modifications and variation will be apparent to those skilled in the art. Embodiments were chosen and described in order to best describe the principles of the technology and its practical applications, thereby enabling others skilled in the relevant art to understand the claimed subject matter, the various embodiments, and the various modifications that are suited to the particular uses contemplated.

What is claimed is:

1. A non-transitory storage medium storing instructions that, when executed by a processor of an interferometric sensing system that is configured to measure binding of analyte molecules in a liquid sample to a probe through analysis of light reflected by a biolayer comprised of the analyte molecules, cause the processor to perform operations comprising:
   obtaining a dataset that is representative of a sequential order of signals,
      wherein each signal is representative of a series of values indicative of intensity of light across a series of wavelengths at a corresponding point in time, the light being received from the probe that is suspended in the liquid sample;
   for each of the signals,
      producing a subtraction curve by comparing the corresponding series of values to another series of values associated with a reference signal;
      calculating an absorbance ratio based on an analysis of the subtraction curve;
      determining whether a principal component of that signal is reflection or absorption based on the absorbance ratio;
      in response to a determination that the principal component is reflection,
         computing a binding magnitude so as to have an absolute value of that signal as the binding magnitude;
      in response to a determination that the principal component is absorption,
         computing a binding magnitude based on an asymmetric component of the subtraction curve; and
   causing display of the binding magnitudes computed for the signals on a plot that is viewable on the interferometric sensing system.

2. The non-transitory storage medium of claim 1, wherein the reference signal is a first signal generated following an initiation phase in which measurements generated by the interferometric sensing system are allowed to become less noisy.

3. The non-transitory storage medium of claim 1, wherein the reference signal is generated by the interferometric sensing system immediately preceding the signals included in the dataset.

4. The non-transitory storage medium of claim 1, wherein the operations further comprise:
   decomposing the subtraction curve into (i) an antisymmetric component that corresponds to phase shift and (ii) the asymmetric component that corresponds to absorption.

5. The non-transitory storage medium of claim 4, wherein to compute the binding magnitude when the principal component is absorption,
   (i) the asymmetric component is divided by an average of at least some pixels of a frame of that signal, so as to produce a less noisy asymmetric component,
   (ii) a root is taken of the less noisy asymmetric component, and
   (iii) the root of the less noisy asymmetric component is multiplied by a coefficient.

6. The non-transitory storage medium of claim 1, further comprising:
   applying a moving average filter to the dataset, so as to compute a moving average of each of the signals.

7. The non-transitory storage medium of claim 1, wherein said producing, said calculating, and said determining are performed as the signals are obtained, such that the binding magnitude is computed in real time.

8. A method for programmatically addressing absorption of light by a biolayer formed along an end of a probe, the method comprising:
- generating, by an interferometric sensing system, a dataset that includes (i) a reference signal and (ii) a series of signals generated after the reference signal,
  - wherein each signal included in the dataset is generated by the interferometric sensing system that is configured to measure light reflected by the end of the probe that is suspended in a liquid sample and upon which the biolayer is formed;
- transmitting, by the interferometric sensing system, the dataset to a computing device via a communication channel;
- comparing, by the computing device, each of the signals to the reference signal, so as to produce a series of subtraction curves; and
- for each of the signals,
  - calculating, by the computing device, an absorbance ratio based on an analysis of the corresponding subtraction curve;
  - determining, by the computing device, whether a principal component of that signal is reflection or absorption based on the absorbance ratio; and
  - computing, by the computing device, a binding magnitude based on the principal component.

9. The method of claim 8, wherein said transmitting is performed in real time as the reference signal and the series of signals are generated by the interferometric sensing system.

10. The method of claim 8, further comprising:
- calculating, by the computing device, an average absorbance ratio for the series of signals based on the absorption ratios calculated for each of the signals;
- comparing, by the computing device, the average absorbance ratio to a threshold value; and
- in response to a determination that the average absorbance ratio is greater than the threshold value,
  - assigning, by the computing device, the series of signals to an absorbance category.

11. The method of claim 10, wherein said computing comprises:
- establishing the binding magnitude for each of the signals based on an asymmetry component in the corresponding subtraction curve.

12. The method of claim 8, further comprising:
- calculating, by the computing device, an average absorbance ratio for the series of signals based on the absorbance ratios calculated for each of the signals;
- comparing, by the computing device, the average absorbance ratio to a threshold value; and
- in response to a determination that the average absorbance ratio is less than the threshold value,
  - assigning, by the computing device, the series of signals to a reflectance category.

13. The method of claim 12, wherein said computing comprises:
- establishing the binding magnitude for each of the signals by computing a cross-correlation value.

14. The method of claim 8, further comprising:
- posting the binding magnitudes computed for the series of signals on a plot that is viewable on an interface.

15. The method of claim 14, wherein the interface is viewable on the interferometric sensing system.

* * * * *